United States Patent
Zhang et al.

(10) Patent No.: US 12,022,872 B2
(45) Date of Patent: Jul. 2, 2024

(54) TOBACCO-HEATING SMOKING SET

(71) Applicant: SHENZHEN FIRST UNION TECHNOLOGY CO., LTD., Guangdong (CN)

(72) Inventors: Shufeng Zhang, Shenzhen (CN); Zongping Yu, Shenzhen (CN); Xiaodong Sun, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 620 days.

(21) Appl. No.: 17/280,212

(22) PCT Filed: Sep. 27, 2019

(86) PCT No.: PCT/CN2019/108553
§ 371 (c)(1),
(2) Date: Mar. 26, 2021

(87) PCT Pub. No.: WO2020/063868
PCT Pub. Date: Apr. 2, 2020

(65) Prior Publication Data
US 2021/0337870 A1    Nov. 4, 2021

(30) Foreign Application Priority Data

Sep. 28, 2018   (CN) .......................... 201821590383.2

(51) Int. Cl.
*A24F 40/46*        (2020.01)
*A24F 40/20*        (2020.01)
(Continued)

(52) U.S. Cl.
CPC .............. *A24F 40/46* (2020.01); *A24F 40/20* (2020.01); *A24F 40/42* (2020.01); *A24F 40/51* (2020.01)

(58) Field of Classification Search
CPC .......... A24F 40/46; A24F 40/20; A24F 40/42; A24F 40/51; A24F 40/40; A24F 40/85;
(Continued)

(56) References Cited

U.S. PATENT DOCUMENTS 5,613,505 A * 3/1997 Campbell .............. H05B 6/365
                                                    131/194
7,185,659 B2 * 3/2007 Sharpe .................... A24F 40/85
                                                    131/194

(Continued)

FOREIGN PATENT DOCUMENTS

CN        204837995 U       12/2015
CN        206443214 U        8/2017
(Continued)

*Primary Examiner* — Alexander Gilman
(74) *Attorney, Agent, or Firm* — Proi Intellectual Property US; Klaus Michael Schmid (57) ABSTRACT

A tobacco-heating smoking set includes: a first component and a second component, wherein the first component includes: a first housing and a bracket, wherein the bracket is fixed on the first housing, and a heating chamber is formed inside the bracket; the second component includes: a second housing and a heating component, the second housing is matched and engaged with the first housing to form a housing of the tobacco-heating smoking set, the heating component is fixed on the second housing, the heating component includes a heating element, the heating element is accommodated in the heating chamber and is configured for heating a cigarette, and the first component is capable of being removed from the second component to expose the heating element.

10 Claims, 10 Drawing Sheets

(51) Int. Cl.
*A24F 40/42* (2020.01)
*A24F 40/51* (2020.01)

(58) Field of Classification Search
CPC .. H01M 50/247; H01M 2220/30; Y02E 60/10
USPC ........................................................ 131/329
See application file for complete search history.

(56) References Cited

U.S. PATENT DOCUMENTS

| | | | | |
|---|---|---|---|---|
| 7,234,470 | B2* | 6/2007 | Yang | A24F 40/46 |
| | | | | 131/194 |
| 8,689,804 | B2* | 4/2014 | Fernando | A24F 40/57 |
| | | | | 131/184.1 |
| 9,499,332 | B2* | 11/2016 | Fernando | B65D 85/1081 |
| 9,717,277 | B2* | 8/2017 | Mironov | H05B 6/108 |
| 11,000,073 | B2* | 5/2021 | Hu | H05B 6/06 |
| 11,197,497 | B2* | 12/2021 | Lee | A24F 40/65 |
| 11,252,999 | B2* | 2/2022 | Lee | A24F 40/20 |
| 11,259,567 | B2* | 3/2022 | Lee | A61M 15/06 |
| 11,324,258 | B2* | 5/2022 | Batista | A24F 40/85 |
| 11,375,753 | B2* | 7/2022 | Fursa | A24F 40/465 |
| 11,382,358 | B2* | 7/2022 | Batista | A24F 40/465 |
| 11,388,932 | B2* | 7/2022 | Courbat | A24F 40/485 |
| 11,478,018 | B2* | 10/2022 | Mironov | A24F 40/485 |
| 2015/0136124 | A1* | 5/2015 | Aronie | A61M 15/0021 |
| | | | | 128/202.21 |
| 2016/0044960 | A1* | 2/2016 | O'Connor | A24F 1/00 |
| | | | | 131/200 |
| 2016/0150825 | A1* | 6/2016 | Mironov | A24F 40/46 |
| | | | | 219/634 |
| 2016/0302486 | A1* | 10/2016 | Eroch | H05B 3/46 |
| 2016/0309782 | A1* | 10/2016 | Malgat | A24F 40/465 |
| 2017/0055580 | A1* | 3/2017 | Blandino | A24D 1/20 |
| 2017/0055587 | A1* | 3/2017 | Zinovik | A24F 40/53 |
| 2017/0086508 | A1* | 3/2017 | Mironov | A24F 40/46 |
| 2017/0340018 | A1* | 11/2017 | Thorens | A61M 15/06 |
| 2018/0214645 | A1* | 8/2018 | Reevell | A24F 40/53 |
| 2018/0263286 | A1* | 9/2018 | Reevell | A61M 15/0003 |

FOREIGN PATENT DOCUMENTS

| | | |
|---|---|---|
| CN | 207383533 U | 5/2018 |
| CN | 207653580 U | 7/2018 |
| CN | 208581844 U | 3/2019 |
| CN | 209234988 U | 8/2019 |
| CN | 209376679 U | 9/2019 |
| EP | 3590365 A1 | 1/2020 |
| JP | 2006174824 A | 7/2006 |
| JP | 2017163975 A | 9/2017 |
| KR | 1020170110566 | 10/2017 |
| WO | 2017075759 A1 | 5/2017 |

* cited by examiner

TOBACCO-HEATING SMOKING SET

This application claims priority to Chinese Patent Application entitled "Tobacco-heating smoking set" with application number of 2018215903832, submitted to China's State Intellectual Property Office on Sep. 28, 2018, the entire contents of which are incorporated herein by reference.

TECHNICAL FIELD

The embodiment of the present disclosure relates to the technical field of smoking sets, and in particular to a tobacco-heating smoking set.

BACKGROUND

Cigarette, as a fancy food, is enjoyed by many people. However, the tar, carbon monoxide and the like substances in the cigarette are harmful to people's health, especially the tar contains over ten cancer genic substances, which greatly impacts people's health. At present, governments around the world have gradually banned smoking (traditional cigarettes) in public places. However, for addictive smokers, it is impossible to completely quit smoking cigarettes; therefore, many substitutes simulating cigarettes appear on the market, for example, nicotine sublingual tablets, electronic cigarettes, etc.

In recent years, there emerges a non-burning tobacco-heating smoking set among electronic cigarettes, which generates an aerosol through low-temperature heating and greatly reduces the production of harmful substances. When tobacco-heating smoking sets of such structure are used to heat smoke products, the heated smoke products are easy to be adhered onto the heating chamber and/or the heating element of the tobacco-heating smoking set; therefore, it is necessary to clean the tobacco-heating smoking set.

To clean the heating chamber or the heating element in existing tobacco-heating smoking sets, generally a special brush is adopted to extend into the heating chamber; however, since the heating chamber generally is of an elongated structure and the heating chamber cannot be separated from the heating element, the tobacco-heating smoking sets cannot be thoroughly cleaned and the cleaning effect is not good.

SUMMARY

In order to solve the problem in the existing technology that the tobacco-heating smoking set cannot be thoroughly cleaned, the embodiment of the present disclosure provides a tobacco-heating smoking set of which the heating chamber can be separated from the heating element, so that it is easy to clean the heating chamber and the heating element. The tobacco-heating smoking set includes:

a first component and a second component, wherein the first component is detachably fixed on the second component;

the first component includes: a first housing and a bracket, wherein the bracket is fixed on the first housing, and a heating chamber is formed inside the bracket for accommodating at least one part of a cigarette;

the second component includes: a second housing and a heating component, wherein the second housing is matched and engaged with the first housing to form a housing of the tobacco-heating smoking set, the heating component is fixed on the second housing, the heating component includes a heating element, the heating element is accommodated in the heating chamber and is configured for heating a cigarette, and the first component is capable of being removed from the second component to expose the heating element.

Optionally, the first component further includes a coil and a first electrical connection part connected to the coil, the coil is arranged on the bracket and is configured for generating an alternating magnetic field, the heating component of the second component is also provided with a second electrical connection part connected to a battery, and the first electrical connection part is configured to electrically contact the second electrical connection part when the first component and the second component are in a connection state.

Optionally, the first electrical connection part includes a first positive terminal and a first negative terminal, the first positive terminal and the first negative terminal are fixedly arranged on the bracket, the coil is sleeved on the outside of the bracket in a spiral shape, the coil has two pins, one of the two pins is in contact with the first positive terminal, and the other of the two pins is in contact with the first negative terminal;

the heating component further includes a pedestal, the second electrical connection part includes a second positive terminal and a second negative terminal, the battery is in electrical connection with the second positive terminal and the second negative terminal, the pedestal is fixed on the second housing, the second positive terminal and the second negative terminal are fixedly arranged on the pedestal, and when the first housing is in fixed connection with the second housing, the second positive terminal is in contact with the first positive terminal, the second negative terminal is in contact with the first negative terminal.

Optionally, the pedestal includes a projection part accommodated in the heating chamber, the projection part defines a first fixed groove along its axial direction, the projection part defines a second fixed groove from the outside along its radial direction, and the second fixed groove is intercommunicated with the first fixed groove;

the heating element includes a fixed part and a heating part, the fixed part is fixed inside the first fixed groove, and the heating part is exposed in the heating chamber;

the heating component further includes a temperature sensor and a fixing element, and the temperature sensor is attached on the fixed part;

the fixing element is accommodated in the second fixed groove, the fixing element has a first end and a second end that are opposite to each other, the first end abuts against the temperature sensor, and the second end abuts against an inner wall of the bracket, so that the temperature sensor is tightly attached on the heating element.

Optionally, the pedestal further includes a base, the base abuts against the bracket, an end surface of the base near the projection part defines a guide groove, the fixing element is provided with a guide part, the guide part fits the guide groove, so that the fixing element slides in the second fixed groove.

Optionally, the base defines a third fixed groove on one end far away the projection part along the axial direction of the pedestal, the third fixed groove is intercommunicated with the first fixed groove, so that the temperature sensor is inserted into the base from the third fixed groove and is attached on the fixing element.

Optionally, the tobacco-heating smoking set further includes an oil isolating element, the oil isolating element is positioned between the base and the extension part, and the oil isolating element is used for isolating a tobacco tar generated when heating a cigarette.

Optionally, in the axial direction of the bracket, the coil clads at least one part of the heating part and the coil does not clad the fixed part.

Optionally, the heating part is tabular, and one end of the heating part far away the fixed part has a height gradually decreasing from the center to two sides.

Optionally, one of the projection part and the bracket is provided with a clamping groove, and the other one of the projection part and the bracket is provided with a clamping rod fitting the clamping groove, so as to realize a clamping fixing between the bracket and the pedestal.

Compared with the existing technology, the tobacco-heating smoking set provided in the present disclosure includes a first component having a bracket and a second component having a heating element, wherein the first component is detachably fixed on the second component. When it is needed to clean the tobacco-heating smoking set, just separate the first component from the second component, such that the heating chamber in the bracket and the heating element are separated from each other and are easy to clean; thus, the cleaning effect of the heating chamber and the heating element is improved.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form restrictions unless otherwise stated.

Description of designators in embodiments.

| Tobacco-heating smoking set 100 | Cigarette 200 | First component 1 | First housing 11 |
|---|---|---|---|
| Bracket 12 | Heating chamber 120 | First limit part 121 | Second limit part 122 |
| Extension part 123 | Clamping rod 124 | Coil 13 | Pin 131 |
| Cigarette holder 14 | First positive terminal 15 | First negative terminal 16 | Second component 2 |
| Second housing 21 | Heating component 22 | Pedestal 221 | Base 2211 |
| Projection part 2212 | First fixed groove 2213 | Second fixed groove 2214 | Clamping groove 2215 |
| Guide groove 2216 | Third fixed groove 2217 | Heating element 23 | Fixed part 230 |
| Heating part 231 | Second positive terminal 24 | Second negative terminal 25 | Battery 26 |
| Temperature sensor 27 | Fixing element 28 | First end 281 | Second end 282 |
| Guide part 283 | Oil isolating element 3 | | |

DETAILED DESCRIPTION

For a better understanding of the present disclosure, a detailed description is provided to the present disclosure in conjunction with the drawings and specific embodiments. It is to be noted that when an element is described as "fixed on" another element, it may be directly on the another element, or there might be one or more intermediate elements between them. When one element is described as "connected to" another element, it may be directly connected to the another element, or there might be one or more intermediate elements between them. Terms "upper", "lower", "left", "right", "inner", "outer" and similar expressions used in this description are merely for illustration.

Unless otherwise defined, all technical and scientific terms used in the description have the same meaning as those normally understood by the skill in the technical field of the present disclosure. The terms used in the description of the present disclosure are just for describing specific implementations, not to limit the present disclosure. Terms "and/or" used in the description include any and all combinations of one or more listed items.

The smoke product in the present disclosure includes any material which provides a volatile substance through being heated, and includes any material containing tobacco and, for example, may include one or more of a tobacco, a tobacco derivative, a swollen tobacco, a reconstituted tobacco or a tobacco substitute. In the present embodiment, for convenient description, a cigarette is used for description.

Figure 1:
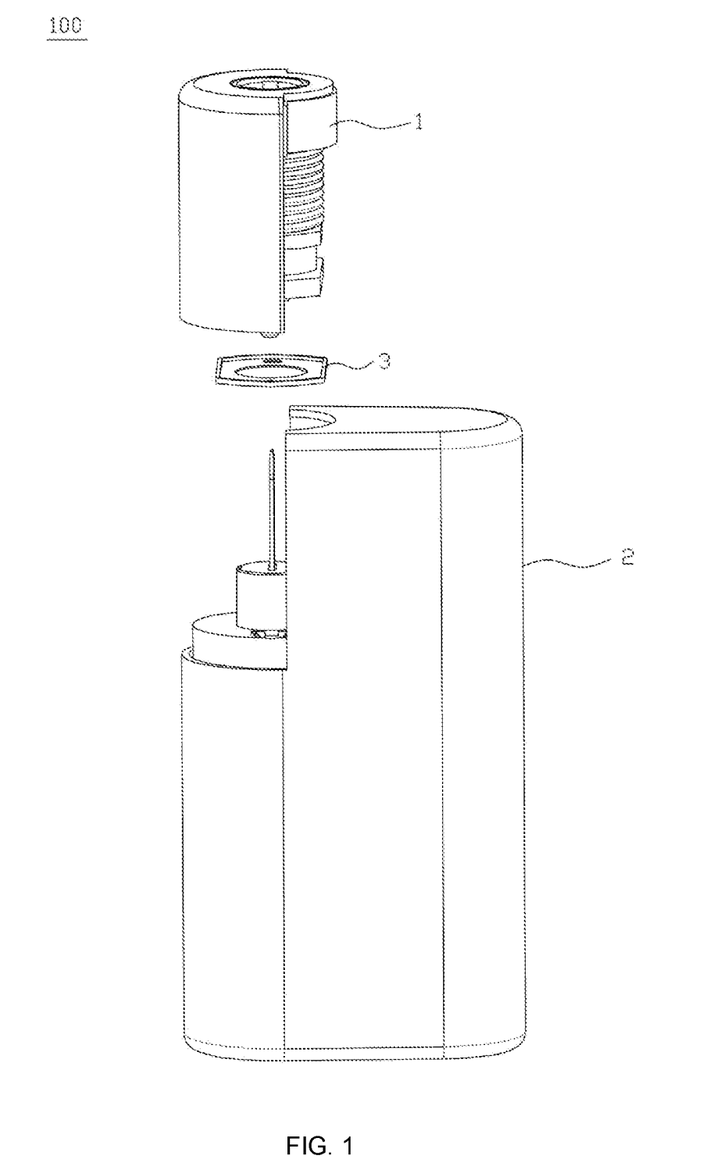
FIG. 1 is a solid exploded view of a tobacco-heating smoking set provided in one embodiment of the present disclosure.
Figure 2:
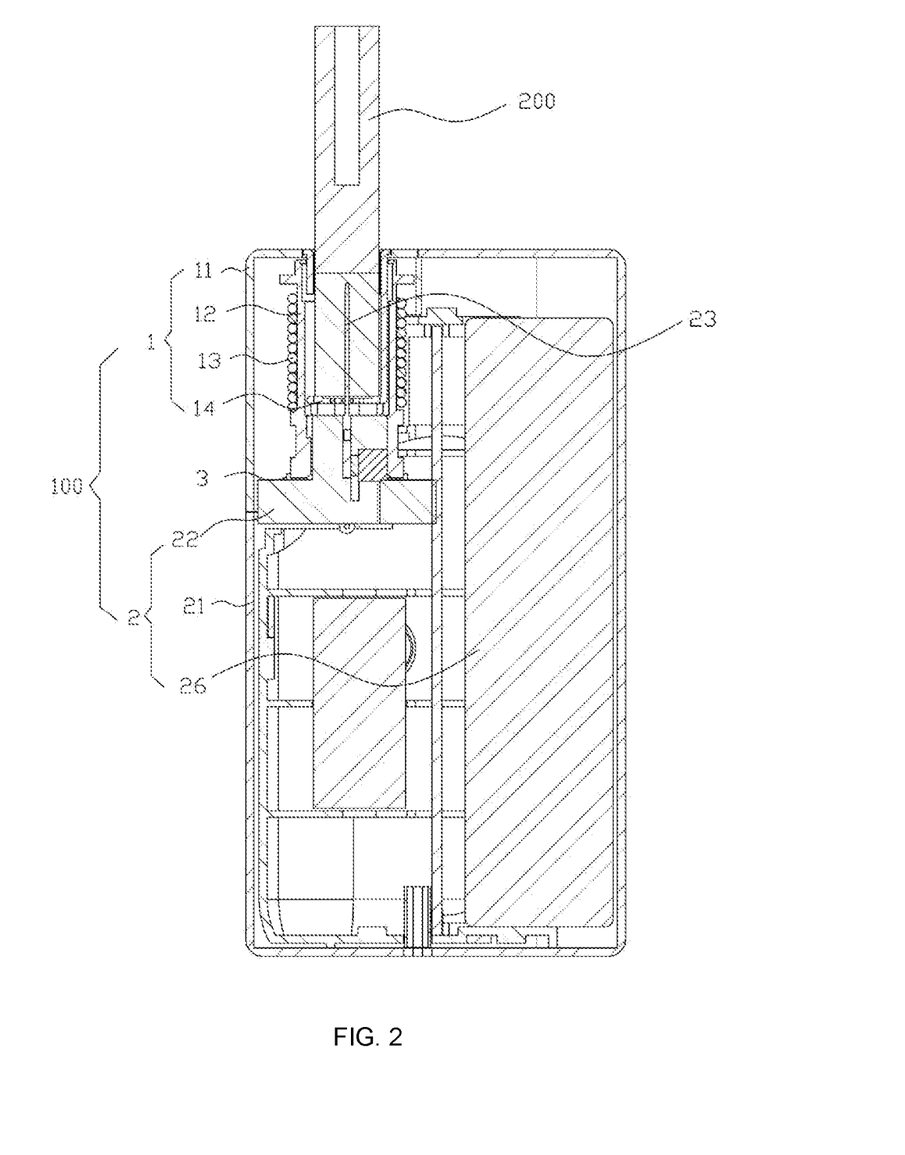
FIG. 2 is a planar sectional view of a tobacco-heating smoking set provided in one embodiment when installed with a cigarette.

As shown in FIG. 1 and FIG. 2, one embodiment of the present disclosure provides a tobacco-heating smoking set. The tobacco-heating smoking set includes a first component 1, a second component 2 and an oil isolating element 3, and the first component 1 is detachably fixed on the second component 2.

Figure 3:
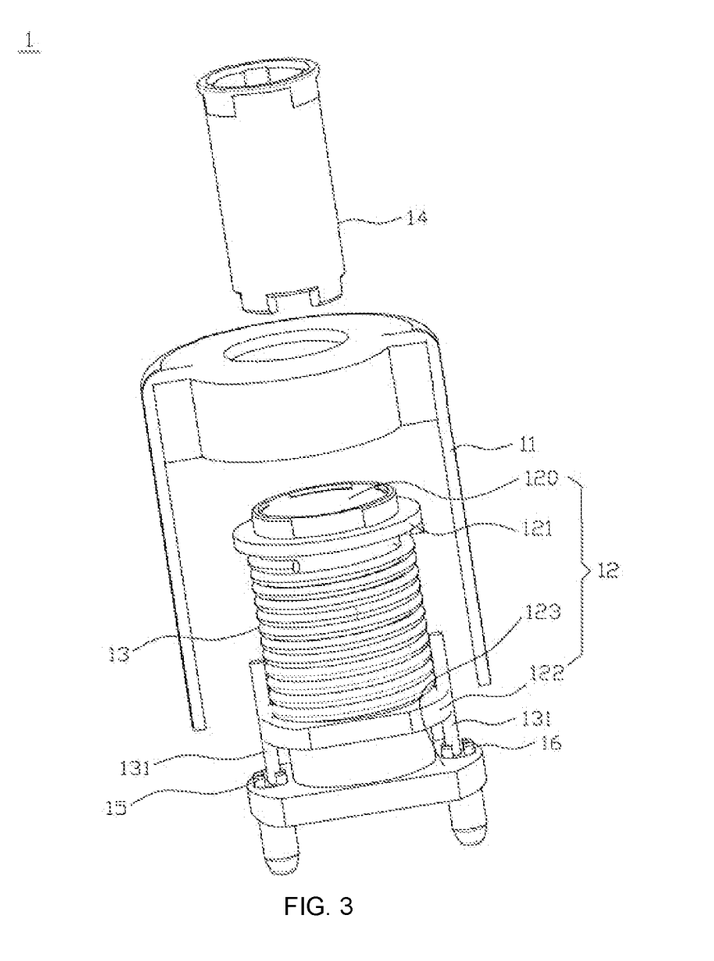
FIG. 3 is a solid exploded view of a first component of a tobacco-heating smoking set provided in one embodiment.

As shown in FIG. 3, the first component 1 includes a first housing 11, a bracket 12, a coil 13, a cigarette holder 14, a first electrical connection part, etc.

The first housing 11 is substantially a cylindrical semi-enclosed structure.

Figure 4:
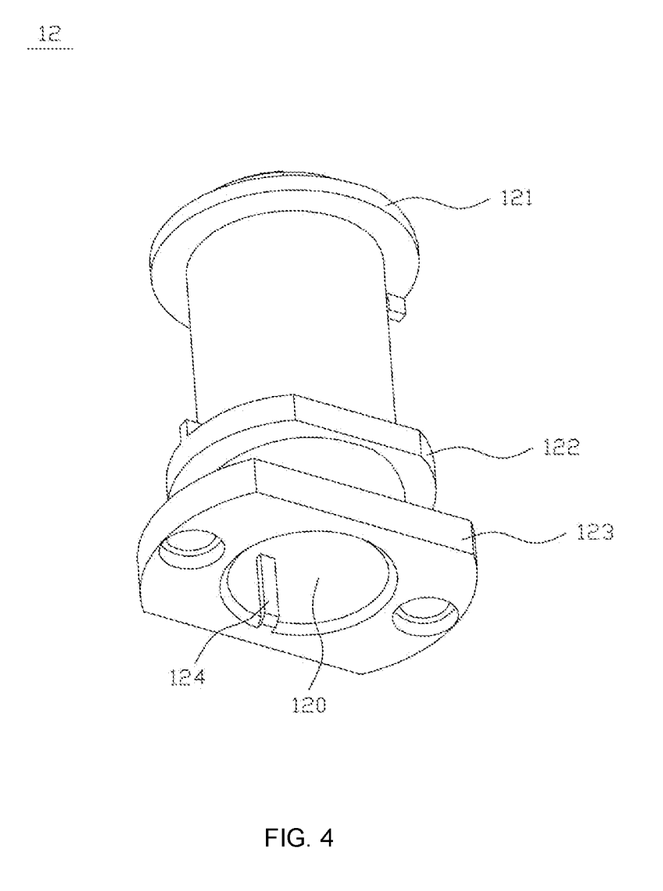
FIG. 4 is a solid view of a bracket of a tobacco-heating smoking set provided in one embodiment.

As shown in FIG. 3 and FIG. 4, the bracket 12 is fixed on the first housing 11, the bracket 12 is substantially a hollow cylinder having upper and lower openings, a lower end of the bracket 12 is provided with a tabular extension part 123, a heating chamber 120 is formed in the bracket 12, an outer wall of the bracket 12 is provided with an annular first limit part 121 and an annular second limit part 122 at intervals, and the first limit part 121 is located above the second limit part 122. A clamping rod 124 is provided on a lower inner wall of the bracket 12, and the clamping rod 124 extends along the axial direction of the bracket 12.

The coil 13 is sleeved on the outside of the bracket 12 in a spiral shape, the coil 13 is located between the first limit part 121 and the second limit part 122, the coil 13 is of a plurality of rings, an insulated enamel wire or an insulated plastic sleeve is coated on an outside of the coil 13 to isolate adjacent conductive core layers in the coil 13, and an alternating current is fed into the coil 13 to generate a varying magnetic field. The coil 13 has two pins 131, and the two pins 131 are used for connecting to an external power supply, so that an alternating current is fed into the coil 13.

The cigarette holder 14 is accommodated and fixed in the heating chamber 120, the cigarette holder 14 has a bottom wall, the bottom wall is used for supporting a cigarette 200, and the bottom wall defines a through hole which runs through the upper and lower sides of the bottom wall. It is understandable that the cigarette holder 14 can also be integrated with the bracket 12.

The first electrical connection part includes a first positive terminal 15 and a first negative terminal 16, the first positive terminal 15 and the first negative terminal 16 are fixed on the extension part 123, the first positive terminal 15 contacts one pin 131 of the coil 13, and the first negative terminal 16 contacts the other pin 131 of the coil 13.

Figure 5:
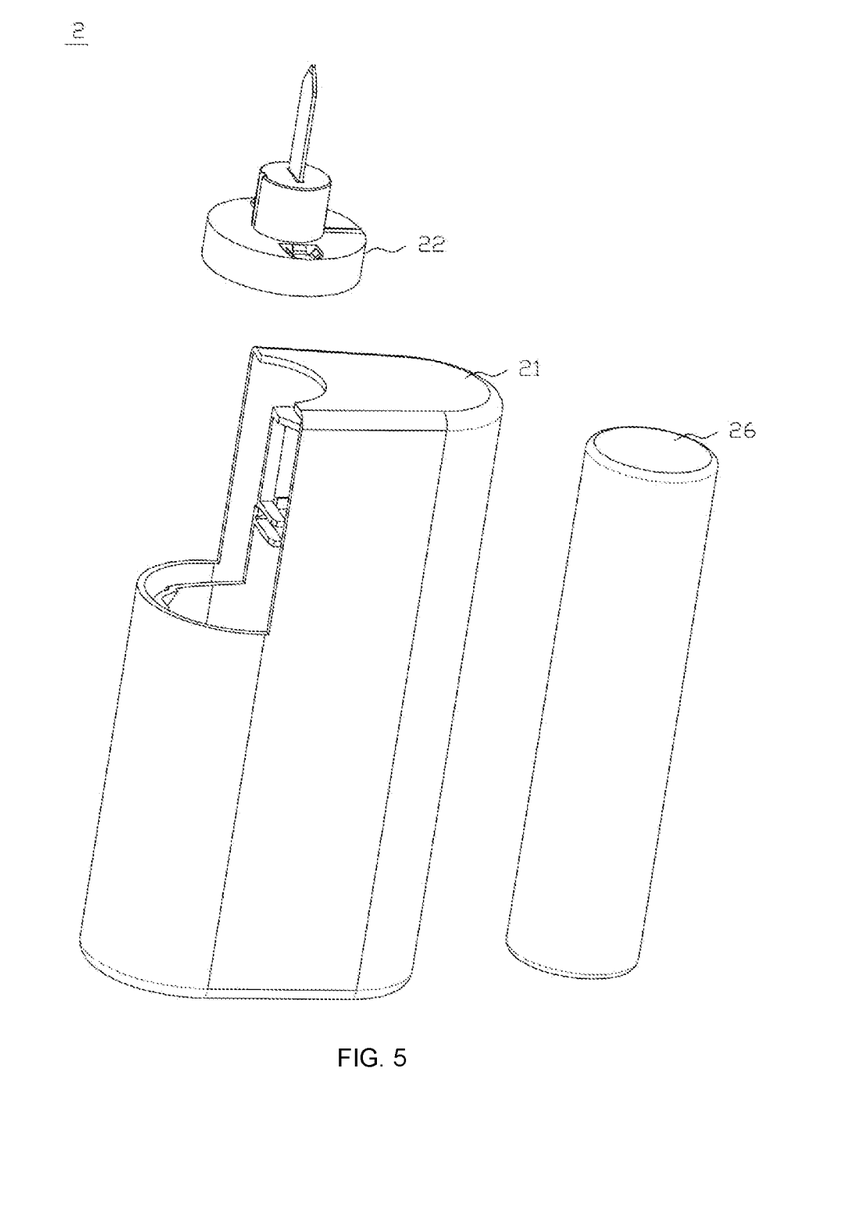
FIG. 5 is a solid exploded view of a second component of a tobacco-heating smoking set provided in one embodiment.

As shown in FIG. 5, the second component 2 includes a second housing 21, a heating component 22, a battery 26, etc.

The second housing 21 and the first housing 11 are in detachable fixed connection. It is understandable that the detachable connection mode between the second housing 21 and the first housing 11 may be a snap-on mode, a magnetic suction mode, etc. Specifically, the snap-on mode may be the following: one of the first housing 11 or the second housing 21 defines a clamping groove 2215, the other one of the first housing 11 or the second housing 21 is provided with a clamping rod 124, the clamping rod 124 is accommodated in the clamping groove 2215, so as to realize the detachable connection between the first housing 11 and the second housing 21; or, an inner wall of the first housing 11 is tightly attached on an outer wall of the second housing 21, so as to realize the detachable connection between the first component 1 and the second component 2.

The magnetic suction may be the following: permanent magnets attracting each other are arranged on connection positions of the first housing 11 and the second housing 21 respectively, so as to realize the detachable connection between the first housing 11 and the second housing 21, thereby realizing the detachable connection between the first component 1 and the second component 2.

Figure 6:
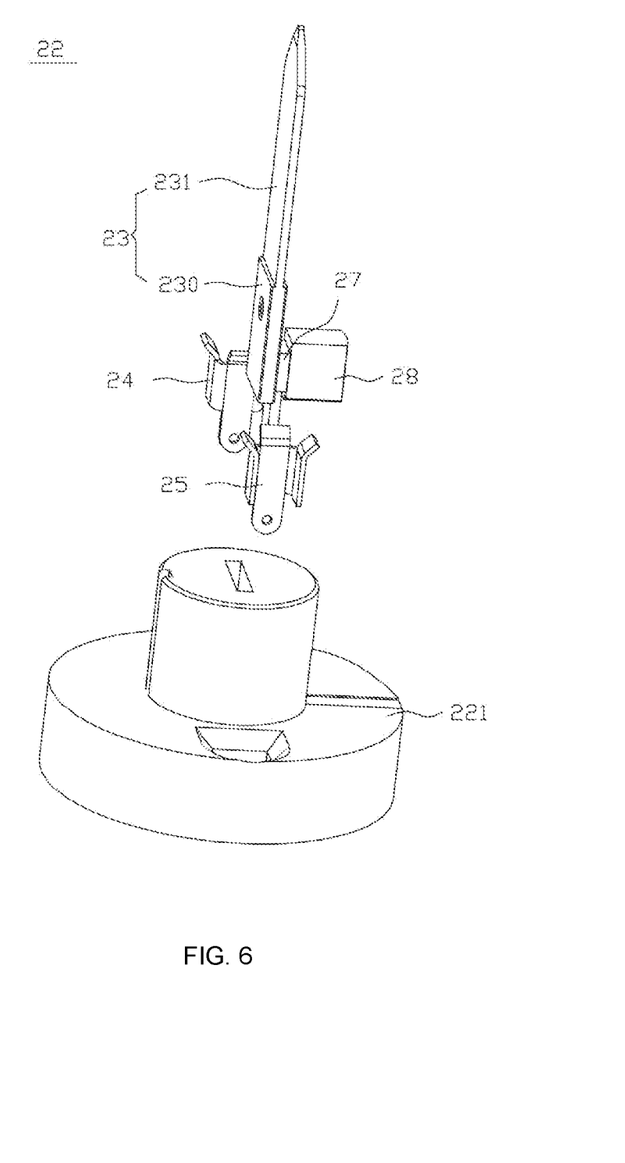
FIG. 6 is a solid exploded view of a heating component of a tobacco-heating smoking set provided in one embodiment.
Figure 7:
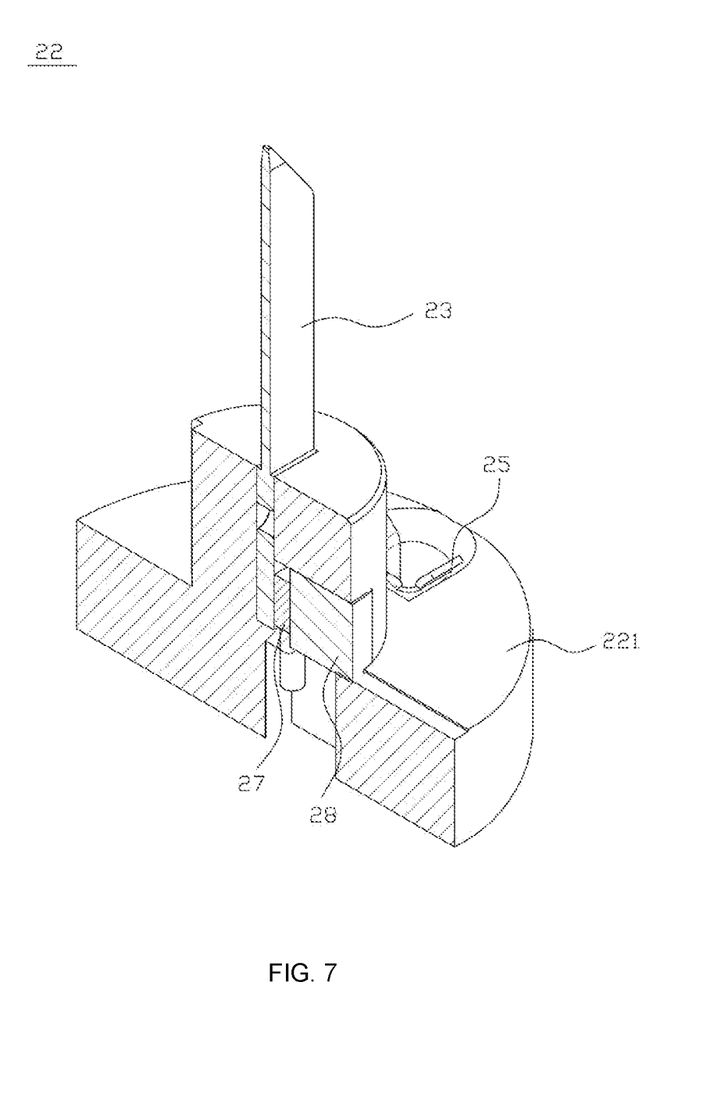
FIG. 7 is a solid sectional view of a heating component of a tobacco-heating smoking set provided in one embodiment.

As shown in FIG. 6 and FIG. 7, the heating component 22 includes a pedestal 221, a heating element 23, a second electrical connection part, a temperature sensor 27, a fixing element 28, etc.

Figure 8:
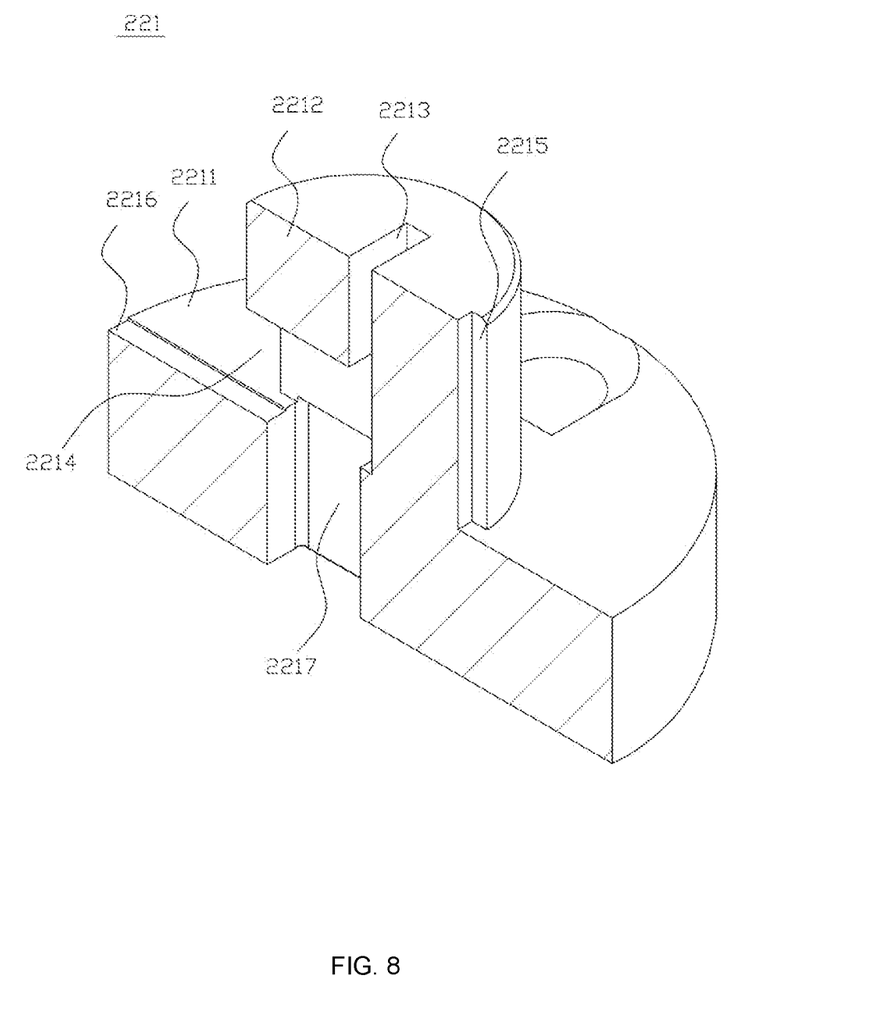
FIG. 8 is a solid sectional view of a pedestal of a tobacco-heating smoking set provided in one embodiment.

The pedestal 221 is fixed on the second housing 21, the pedestal 221 is located on one end of the bracket 12, that is, below the bracket 12, the pedestal 221 is made from a heat-resisting plastic material, for example, polyimide (PI), Polyetheretherketone (PEEK), Polyetherimide (PEI), etc. The pedestal 221 includes a base 2211 and a projection part 2212. The projection part 2212 extends upwards from the base 2211, an outer diameter of the projection part 2212 is less than an outer diameter of the base 2211, and the projection part 2212 is accommodated in the heating chamber 120 of the bracket 12. The projection part 2212 defines a first fixed groove 2213 downwards from its upper end surface, that is, the projection part 2212 defines a first fixed groove 2213 along its axial direction, and the first fixed groove 2213 is located at the center of the projection part 2212.

The projection part defines a second fixed groove 2214 from the outside along its radial direction, and the second fixed groove 2214 is intercommunicated with the first fixed groove 2213. The projection part 2212 defines a clamping groove 2215 on the outside thereof along its axial direction. The clamping groove 2215 and the second fixed groove 2214 are located at two sides of the first fixed groove 2213 respectively. The clamping groove 2215 is used for accommodating the clamping rod 124, thereby realizing the clamping fixing between the bracket 12 and the pedestal 221.

It is understandable that in some other embodiments that the clamping groove 2215 may be defined on the inner wall of the bracket 12 and the clamping rod 124 may be arranged on the projection part 2212.

An outer diameter of the base 2211 is greater than an outer diameter of the projection part 2212. An upper surface of the base 2211 defines a guide groove 2216, that is, an end surface of the base 2211 near the projection part defines a guide groove 2216. The base 2211 defines a third fixed groove 2217 upwards on a lower end surface thereof, and the third fixed groove 2217 is intercommunicated with the first fixed groove 2213.

The heating element 23 is tabular. The heating element 23 includes a fixed part 230 and a heating part 231, the fixed part 230 is integrated with the heating part 231, the heating element 23 is made from a high-permeability metal material, and the heating element 23 may be made from iron dust core, Fe—Ni 50, FeSiAl, FeNiMo and other materials. The fixed part 230 is accommodated and fixed in the first fixed groove 2213, the heating part 231 extends upwards from the fixed part 230, and one end of the heating part 231 far away the fixed part 230 has a height gradually decreasing from the center to two sides.

The heating part 231 is exposed in the heating chamber 120; in the axial direction of the bracket 12, the coil 13 clads at least one part of the heating part 231 and the coil 13 does not clad the fixed part 230; an alternating magnetic field generated by the coil 13 penetrates the heating part 231, so that an eddy current is generated in the heating part 231, then the eddy current enables the conductive magnet molecules in the heating element 23 to perform a high-speed irregular movement; thus, the molecules collide and rub against each other to generate a heat energy, thereby heating a cigarette 200 to generate an aerosol for a user to directly inhale.

The second electrical connection part includes a second positive terminal 24 and a second negative terminal 25, the second positive terminal 24 and the second negative terminal 25 are fixedly arranged on the base 2211 of the pedestal 221, and when the first component 1 is in fixed connection with the second component 2, that is, when the first housing 11 is in fixed connection with the second housing 21, the second positive terminal 24 is in contact with the first positive terminal 15, the second negative terminal 25 is in contact with the first negative terminal 16, that is, the second electrical connection part is configured to be in electrical contact with the first electrical connection part when the first component 1 and the second component 2 are in a connection state.

As shown in FIG. 2, the battery 26 is fixed in the second housing 21, the battery 26 is configured for supplying an electrical energy to the coil 13, and the battery 26 may be a disposable dry cell 26, a button cell 26 or a rechargeable lithium battery 26, etc. In the present embodiment, the battery 26 is a rechargeable battery 26, and the battery 26 is in electrical connection with the second positive terminal 24 and the second negative terminal 25.

As shown in FIG. 2, FIG. 6 and FIG. 7, the temperature sensor 27 is arranged on the fixed part 230 of the heating element 23, the temperature sensor 27 is not covered by the coil 13, the temperature sensor 27 is used for detecting the temperature of the heating element 23, and the temperature sensor 27 can communicate with an external controller (not shown, similarly hereinafter), so that the controller can control the temperature of the heating element 23.

Figure 9:
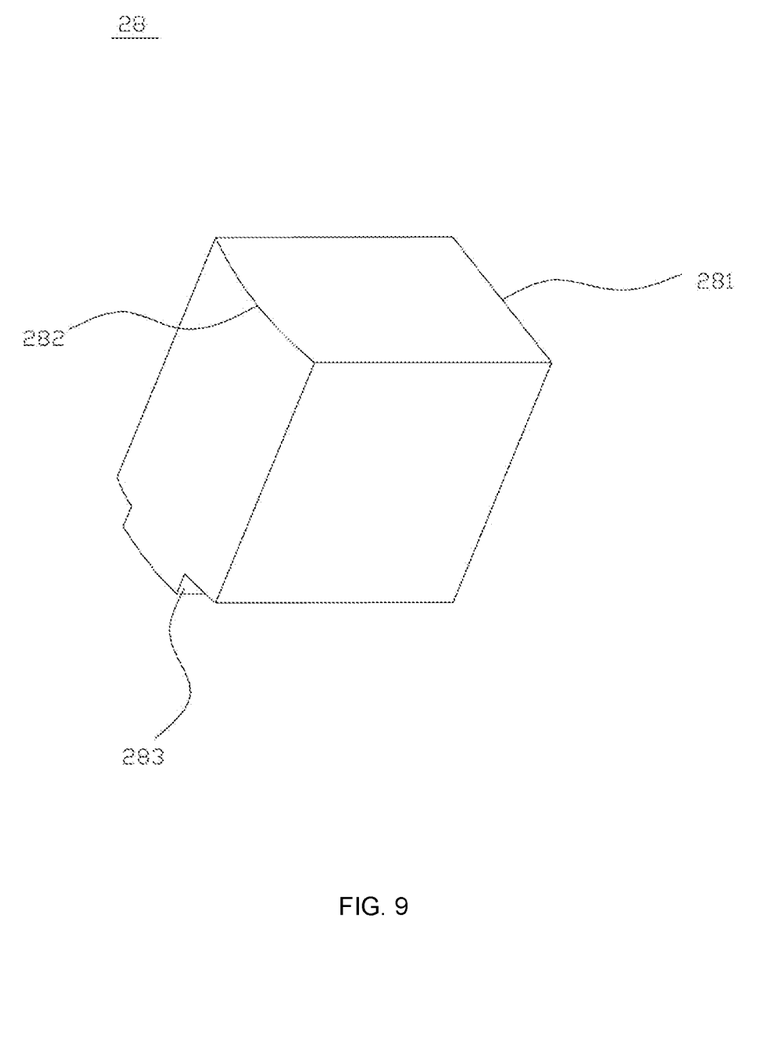
FIG. 9 is a solid view of a fixing element of a tobacco-heating smoking set provided in one embodiment.

As shown in FIG. 2, FIG. 7 and FIG. 9, the fixing element 28 is substantially a rectangular block, the fixing element 28 has a first end 281 and a second end 282 that are opposite to each other, the first end 281 is a planar surface, the second end 282 is an arc surface, the first end 281 abuts against the temperature sensor 27, and the second end 282 abuts against an inner wall of the bracket 12, so that the temperature sensor 27 is tightly attached on the heating element 23. A lower end of the fixing element 28 extends a guide part 283 fitting the guide groove 2216, so that the fixing element 28 slides in the second fixed groove 2214.

Figure 10:
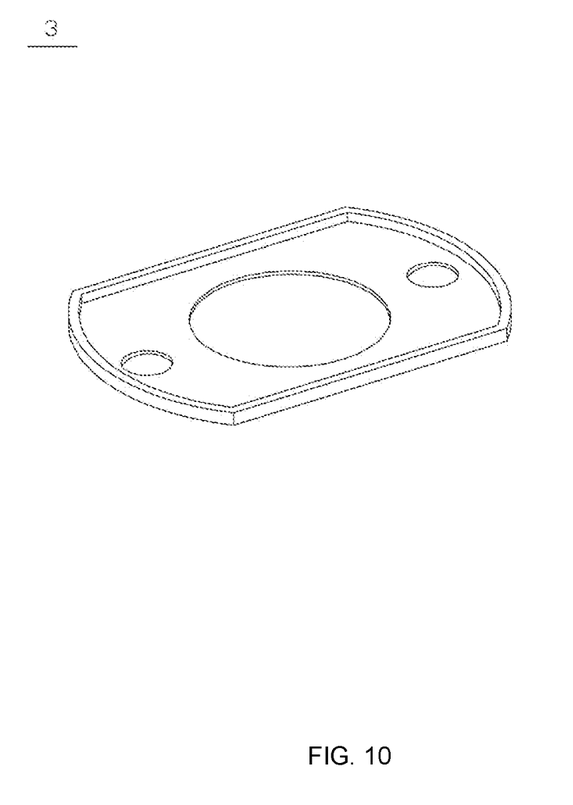
FIG. 10 is a solid view of an oil isolating element of a tobacco-heating smoking set provided in one embodiment.

As shown in FIG. 2 and FIG. 10, the oil isolating element 3 is made of a plastic material or a silicone material, the oil isolating element 3 has a center hole, so that the oil isolating element 3 is sleeved on the outside of the projection part 2212 of the pedestal 221, and the oil isolating element 3 is positioned between the extension part 123 of the bracket 12 and the base 2211 of the pedestal 221; when the heating element 23 heats a cigarette 200 after being heated, a tobacco tar will be generated, and the oil isolating element 3 is used for preventing the tobacco tar entering the second housing 21 to damage the circuit board (not shown) in the second housing 21. The oil isolating element 3 can also be removed from the pedestal 221, so that it is easy to clean or replace the oil isolating element 3.

When the cigarette 200 inserted into the tobacco-heating smoking set 100 is completely heated, detach the first component 1 from the second component 2, then the cigarette 200 can be removed from the heating chamber 120, meanwhile the bracket 12 is separated from the heating element 23, so that the user can easily clean the heating chamber 120 in the bracket 12 and the heating element 23.

The embodiment of the present disclosure has the following effect:

1). The tobacco-heating smoking set 100 includes a first component 1 having a bracket 12 and a second component 2 having a heating element 23, wherein the first component 1 is detachably fixed on the second component 2. When it is needed to clean the tobacco-heating smoking set 100, just separate the first component 1 from the second component 2, such that the heating chamber 120 in the bracket 12 and the heating element 23 are separated from each other and are easy to clean; thus, the cleaning effect of the heating chamber 120 and the heating element 23 is improved.

2). The first positive terminal 15 and the first negative terminal 16 are fixed on the bracket 12 of the first component 1, and the second positive terminal 24 and the second negative terminal 25 are fixed on the pedestal 221 of the second component 2; when the first component 1 is detached from the second component 2, the coil 13 on the first component 1 is disconnected from the battery 26.

3). A fixing element 28 is arranged in the projection part 2212 of the pedestal 221, the fixing element 28 has a first end 281 and a second end 282 that are opposite to each other, the first end 281 abuts against the temperature sensor 27, and the second end 282 abuts against an inner wall of the bracket 12, so that the temperature sensor 27 is tightly attached on the heating element 23; therefore, the installation between the temperature sensor 27 and the heating element 23 is economical and simple.

4). In the axial direction of the bracket 12, the coil 13 clads at least one part of the heating part 231 and the coil 13 does not clad the fixed part 230, such that a magnetic induction line generated when the coil 13 is electrified does not penetrate the temperature sensor 27 attached and fixed to the fixed part 230, which does not cause the temperature sensor 27 to generate heat and guarantees the accuracy of the temperature detection conducted by the temperature sensor 27 for the heating element 23.

It should be noted that although the description and accompanying drawings of the present disclosure illustrate some preferred embodiments of the present disclosure, the present disclosure may be implemented through many different forms, but not restricted to the embodiments described in the description. These embodiments shall not be construed as additional limitations on the contents of the present disclosure. These embodiments are described for the purpose of providing a more thorough and comprehensive understanding of the disclosed content of the present disclosure. Moreover, various embodiments not listed above formed by the above technical features combining with each other are all intended to be included in the scope of the present disclosure; furthermore, for the ordinary skill in the art, improvements or transformations may be made according to the above description, and these improvements and transformations shall belong to the protection scope of the claims appended below.

What is claimed is:

1. A tobacco-heating smoking set, wherein, the tobacco-heating smoking set comprises:
    a first component and a second component, wherein the first component is detachably fixed on the second component;
    the first component comprising: a first housing and a bracket, wherein the bracket is fixed on the first housing, and a heating chamber is formed inside the bracket for accommodating at least one part of a cigarette;
    the second component comprises: a second housing and a heating component, wherein the second housing is matched and engaged with the first housing to form a housing of the tobacco-heating smoking set, the heating component is fixed on the second housing, the heating component comprises a heating element, the heating element is accommodated in the heating chamber, and is configured for heating a cigarette, and the first component is capable of being removed from the second component to expose the heating element.

2. The tobacco-heating smoking set according to claim 1, wherein, the first component further comprises a coil and a first electrical connection part connected to the coil, the coil is arranged on the bracket and is configured for generating an alternating magnetic field, the heating component of the second component is also provided with a second electrical connection part connected to a battery, and the first electrical connection part is configured to electrically contact the second electrical connection part when the first component and the second component are in a connection state.

3. The tobacco-heating smoking set according to claim 2, wherein, the second component further comprises a battery, and the battery is used for supplying power to the coil; the first electrical connection part comprises a first positive terminal and a first negative terminal, the first positive terminal and the first negative terminal are fixedly arranged on the bracket, the coil is sleeved on the outside of the bracket in a spiral shape, the coil has two pins, one of the two pins is in contact with the first positive terminal, and the other of the two pins is in contact with the first negative terminal;

the heating component further comprises a pedestal, the second electrical connection part comprises a second positive terminal and a second negative terminal, the battery is in electrical connection with the second positive terminal and the second negative terminal, the pedestal is fixed on the second housing, the second positive terminal and the second negative terminal are fixedly arranged on the pedestal, and when the first housing is in fixed connection with the second housing, the second positive terminal is in contact with the first positive terminal, the second negative terminal is in contact with the first negative terminal.

4. The tobacco-heating smoking set according to claim 3, wherein, the pedestal comprises a projection part accommodated in the heating chamber, the projection part defines a first fixed groove along its axial direction, the projection part defines a second fixed groove from the outside along its radial direction, and the second fixed groove is intercommunicated with the first fixed groove;

the heating element comprises a fixed part and a heating part, the fixed part is fixed inside the first fixed groove, and the heating part is exposed in the heating chamber;

the heating component further comprises a temperature sensor and a fixing element, and the temperature sensor is attached on the fixed part;

the fixing element is accommodated in the second fixed groove, the fixing element has a first end and a second end that are opposite to each other, the first end abuts against the temperature sensor, and the second end abuts against an inner wall of the bracket, so that the temperature sensor is tightly attached on the heating element.

5. The tobacco-heating smoking set according to claim 4, wherein, the pedestal further comprises a base, the base abuts against the bracket, an end surface of the base near the projection part defines a guide groove, the fixing element is provided with a guide part, the guide part fits the guide groove, so that the fixing element slides in the second fixed groove.

6. The tobacco-heating smoking set according to claim 5, wherein the base defines a third fixed groove on one end far away the projection part along the axial direction of the pedestal, the third fixed groove is intercommunicated with the first fixed groove, so that the temperature sensor is inserted into the base from the third fixed groove and is attached on the fixing element.

7. The tobacco-heating smoking set according to claim 5, wherein a lower end of the bracket is provided with a tabular extension part; the tobacco-heating smoking set further comprises an oil isolating element, the oil isolating element is positioned between the base and the extension part, and the oil isolating element is used for isolating a tobacco tar generated when heating a cigarette.

8. The tobacco-heating smoking set according to claim 4, wherein in the axial direction of the bracket, the coil clads at least one part of the heating part and the coil does not clad the fixed part.

9. The tobacco-heating smoking set according to claim 4, wherein the heating part is tabular, and one end of the heating part far away the fixed part has a height gradually decreasing from the center to two sides.

10. The tobacco-heating smoking set according to claim 4, wherein one of the projection part and the bracket is provided with a clamping groove, and the other one of the projection part and the bracket is provided with a clamping rod fitting the clamping groove, so as to realize a clamping fixing between the bracket and the pedestal.

* * * * *